5/7/85 XR 4,515,178 SR

United States Patent [19]
Campau

[11] Patent Number: 4,515,178
[45] Date of Patent: May 7, 1985

[54] LIQUID LEVEL CONTROL DEVICE

[76] Inventor: Daniel N. Campau, 656 Duxbury Ct., Grand Rapids, Mich. 49506

[21] Appl. No.: 614,550

[22] Filed: May 29, 1984

[51] Int. Cl.[3] .......... F15C 1/14; F16K 21/18

[52] U.S. Cl. .......... 137/393; 73/290 R; 137/842; 141/198; 222/64

[58] Field of Search .......... 137/386, 393, 814, 815, 137/816, 817, 818, 842, 414; 141/198, 206, 209; 73/290 R; 222/64

[56] References Cited

U.S. PATENT DOCUMENTS

| | | | |
|---|---|---|---|
| Re. 29,715 | 8/1978 | Richards | 141/226 |
| 3,561,465 | 2/1971 | de Graaf | 137/386 |
| 3,703,907 | 11/1972 | Richards | 137/386 |
| 4,202,367 | 5/1980 | Roth et al. | 137/393 |
| 4,211,249 | 7/1980 | Richards | 73/290 R |
| 4,296,996 | 10/1981 | Pataki et al. | 137/393 |
| 4,345,618 | 8/1982 | Altman et al. | 137/393 |
| 4,444,222 | 4/1984 | Yamagiwa | 137/393 |

*Primary Examiner*—George L. Walton
*Attorney, Agent, or Firm*—Niro, Scavone

[57] ABSTRACT

A fluid amplifier for sensing the level of a liquid in a reservoir, storage tank or other container and for generating a differential in pressure signal in response to the static presence of the liquid level at a predetermined level. An inlet develops a liquid flow stream. A first passage of major cross-sectional dimensions is provided for delivering a major portion of the flow stream to the reservoir or storage tank. A second passage of minor cross-sectional dimensions is spaced laterally of the first passage for developing a small signal fluid power stream substantially parallel to the major supply stream. A sensor is responsive to the static presence of the liquid level at the predetermined level for altering the smaller fluid power stream from its substantially parallel flow condition to a condition in which it diverts and attaches to the major supply stream. A signal developing device is provided for receiving a fluid pressure signal of one magnitude when the fluid power stream is parallel to the major supply stream and of a second magnitude when the fluid power stream is diverted.

17 Claims, 6 Drawing Figures

LIQUID LEVEL CONTROL DEVICE

BACKGROUND OF THE INVENTION

This invention relates generally to liquid level control devices and, in particular, to devices which may be utilized as filler nozzles to control the flow of liquid into a reservoir, storage tank or other container and to control the level of liquid therein. The device of the present invention is particularly useful in an application where automatic shut-off features are desirable.

For instance, in U.S. Pat. No. 3,703,907, a fluid amplifier is disclosed having an inlet and an outlet zone and adapted for use in a liquid reservoir to sense a change of liquid level therein. The amplifier is adapted to be positioned adjacent the desired liquid sensing level in the reservoir and adapted for directing a power stream substantially transversely to the surface of the liquid in the reservoir. Inlet means is constructed and arranged such that a fluid power jet is abruptly altered when the liquid level in the reservoir rises to a sensing level. This abrupt alteration develops a fluid pressure signal which may be used to control various apparatus, such as a pressure responsive fluid valve.

Such fluid amplifiers have been used in various applications. My copending patent application Ser. No. 491,521, filed May 4, 1983 discloses the use of fluid amplifiers in a filling device for use in connection with maintaining proper levels of electrolyte in individual cells of industrial batteries. My copending patent application Ser. No. 404,070, filed Aug. 2, 1982 shows the use of a fluid amplifier wherein the sensing level of liquid in a reservoir is at a remote point from the fluid amplifier itself.

Fluid amplifiers of the character described also have been used in automatic shut-off nozzles as disclosed in U.S. Pat. No. Re. 29,715 wherein a nozzle is shown particularly useful in an application such as self-service gasoline retail outlets.

In the applications of fluid amplifiers described above, the main liquid flow stream also comprises the fluid power stream which develops a pressure signal of a given magnitude. In order to change the signal, all or a major part of the power stream must be altered or diverted to render a signal of a second magnitude. In other words, in order to switch the signal completely off to operate a pressure valve, for instance, which controls the major liquid flow stream, substantially the entire power stream must be deflected at least to some degree. This requires significantly large dimensions for the amplifier to allow the power stream to deflect. The amount and stability of the deflection often is dependent on downstream conditions. In addition, deflection requires a significant amount of control signal flow to enable switching to occur. Although prior fluid amplifiers are very effective in many applications, as described above, particularly due to their excellent pressure recovery, various sizes are required to accommodate a required flow rate.

Furthermore, although prior fluid amplifiers of the character described will function with fluids of various viscosities, the geometry of the fluid amplifier must be altered and optimized for use within relatively narrow viscosity ranges.

There is a need for and it would be desirable to provide a liquid level control device which employs a fluid amplifier and which is substantially independent of the volume of fluid flow, its flow rate as well as the fluid viscosity. This need is particularly prevalent in liquid level control devices incorporating automatic shut-off characteristics. An example of such a need is in nozzles for filling very large tankers where a high volume flow rate is practically mandatory and where high viscosity liquids may be dispensed.

SUMMARY OF THE INVENTION

An object, therefore, of the present invention is to provide a liquid level control device for controlling the flow of liquid into a reservoir, storage tank or other container, including automatic shut-off characteristics, and wherein the device is applicable to accommodate a wide range of flow rates and fluid viscosities.

This and other objects of the invention are carried out by providing a fluid amplifier which includes a "dual-jet system". In other words, one passage through the amplifier is of major cross-sectional dimensions for delivering a major portion of the liquid to a reservoir, storage tank or the like. A second passage of minor cross-sectional dimensions develops the signal for controlling the liquid level in the reservoir or storage tank independently of the major flow stream.

In the exemplary embodiment of the invention, the fluid amplifier is adapted for sensing the level of a liquid in a reservoir, storage tank or other container and for generating a differential in pressure signal in response to the static presence of the liquid level at a predetermined level. Inlet means is provided for developing a liquid flow stream. First passage means is provided of major cross-sectional dimensions for delivering a major portion of the liquid in a supply stream to the reservoir or storage tank. Second passage means is provided of minor cross-sectional dimensions spaced laterally of the first passage means for developing a fluid power stream which flows substantially parallel to the major supply stream. Sensing means is responsive to the static presence of the liquid level at the predetermined level for altering the fluid power stream from its parallel condition. Signal developing means is provided for receiving a fluid pressure signal of one magnitude when the fluid power stream is parallel and of a second magnitude when the fluid power stream is altered.

The "dual-jet" fluid amplifier is disclosed herein as incorporated in nozzle means for developing the main liquid flow stream therethrough, with valve means in the liquid flow stream for opening and closing the nozzle. Manually operable valve opening means also is provided. The fluid amplifier is disposed in the main liquid flow stream of the nozzle and is operatively associated with the valve means for generating a positive fluid pressure to maintain the valve means open.

The fluid amplifier and/or nozzle can have its terminus positioned at the predetermined level whereby the static presence of the liquid level at the terminus of the outlet means causes the fluid power stream to be altered and diverted toward the major portion of the liquid passing through the first passage means. Thus, the terminus of the outlet means comprises the sensing means for the amplifier. As the liquid level rises to the terminus of the outlet means, the pressure between the major supply power stream and the smaller signal power stream is reduced and a pressure imbalance develops which causes the smaller signal stream to bend into attachment with the main supply stream.

The "dual-jet" amplifier also can be used with remote sensing means. To this end, the amplifier includes an access region to the smaller signal power stream. The sensing means is remote from and in communication with the access region, such as by conduit means in the form of an open ended tube. The conduit means is in communication with and leads from the access region to a predetermined point for sensing the level of liquid in the reservoir or storage tank. Thus, the remote sensing means is responsive to the static presence of the interface at the predetermined liquid level to alter and/or deflect the smaller signal power stream.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 6 is a fragmented vertical section through a wall or the like, illustrating the nozzle of FIG. 4 incorporated in a faucet or the like.

DETAILED DESCRIPTION OF THE PREFERRED EMBODIMENT

Figure 1:
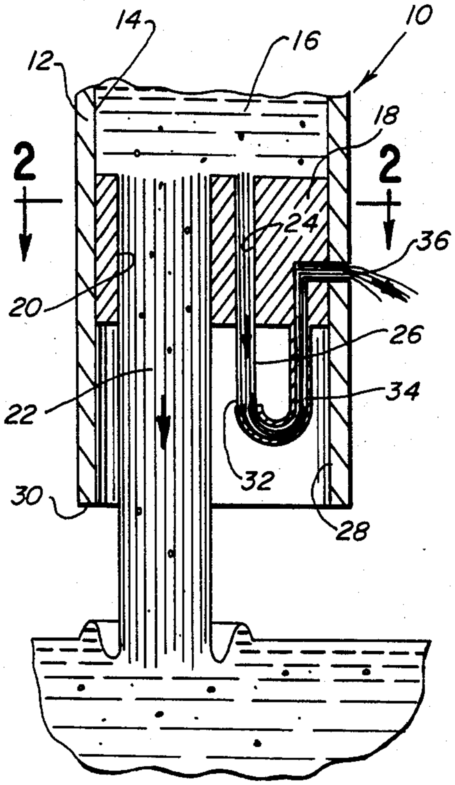
FIG. 1 is a fragmented vertical section through the "dual jet" fluid amplifier of the present invention, the amplifier being in filling mode supplying a positive pressure signal to maintain a supply open.

Referring to the drawings in greater detail, and first to FIG. 1, one embodiment of a "dual jet" fluid amplifier incorporating the concepts of the present invention is illustrated and generally designated 10. Fluid amplifier 10 is adapted for sensing the level of a liquid in a reservoir, storage tank or other container and for generating a differential in pressure signal in response to the static pressure of the liquid level at a predetermined level.

More particularly, fluid amplifier 10 includes a housing 12 having inlet means 14 for developing a liquid flow stream 16. A partition 18 is fixed within housing 12 and defines a first passage 20 of major cross-sectional dimensions for delivering a major portion of the liquid to the reservoir or storage tank, in the form of a main supply stream 22. A second passage 24 in partition 18 is of minor cross-sectional dimensions and is spaced laterally of and substantially parallel to first passage 20. The second passage develops a signal power stream 26.

It immediately can be seen that the size and flow rate of liquid through passage 20, defining main supply stream 22, is totally independent of the size of signal power stream 26. The signal power stream also is not affected by the viscosity of liquid passing through first passage 20 which defines the main supply stream.

Figure 3:
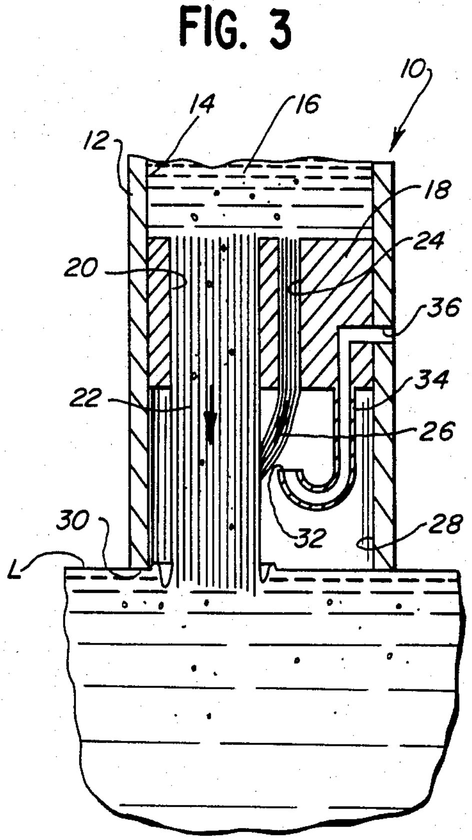
FIG. 3 is a fragmented vertical section similar to that of FIG. 1, with the liquid level having risen to the terminus of the sensing outlet of the amplifier, and with the smaller signal power stream diverted into attachment with the larger supply power stream.
Figure 2:
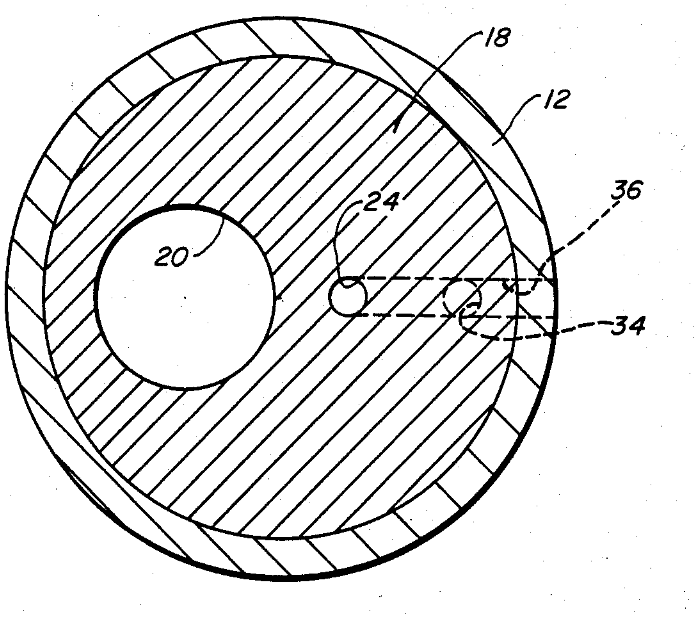
FIG. 2 is a sectional view, on an enlarged scale, taken generally along line 2—2 of FIG. 1.

Sensing means is responsive to the static presence of the liquid level at the predetermined level for altering signal power stream 26 from its parallel condition. In the embodiment of the invention shown in FIGS. 1–3, the sensing means comprises outlet 28 of the amplifier, the outlet having a terminus 30 positioned at a predetermined level "L" (FIG. 3) whereby the static presence of the liquid level at terminus 30 of outlet 28 causes signal power stream 26 to be altered and diverted toward main supply stream 22, as illustrated in FIG. 3. Specifically, when the end of the sensor defined by the terminus of outlet 28 is blocked by the rising liquid level, the pressure within the sensor defined by the housing surrounding the outlet is reduced. The pressure between main supply stream 22 and smaller signal power stream 26 is reduced by even a greater amount due to entrainment by the jets of the surrounding fluid. A pressure imbalance develops. The pressure imbalance causes the smaller signal power stream to bend into attachment with the main supply stream.

Signal developing means in the form of a port 32 at the distal end of an elbow-shaped conduit 34 is provided for receiving a fluid pressure from signal power stream 26 in the mode of operation shown in FIG. 1. The fluid pressure signal is of one magnitude, such as a given positive pressure, developed by signal power stream 26 (i.e. FIG. 1). The fluid pressure signal is of a lesser magnitude when signal power stream 26 is altered into attachment with main supply stream (i.e. FIG. 3). The signal developing means is in communication, through conduit means 36, to appropriate control apparatus, as described below.

Figure 4:
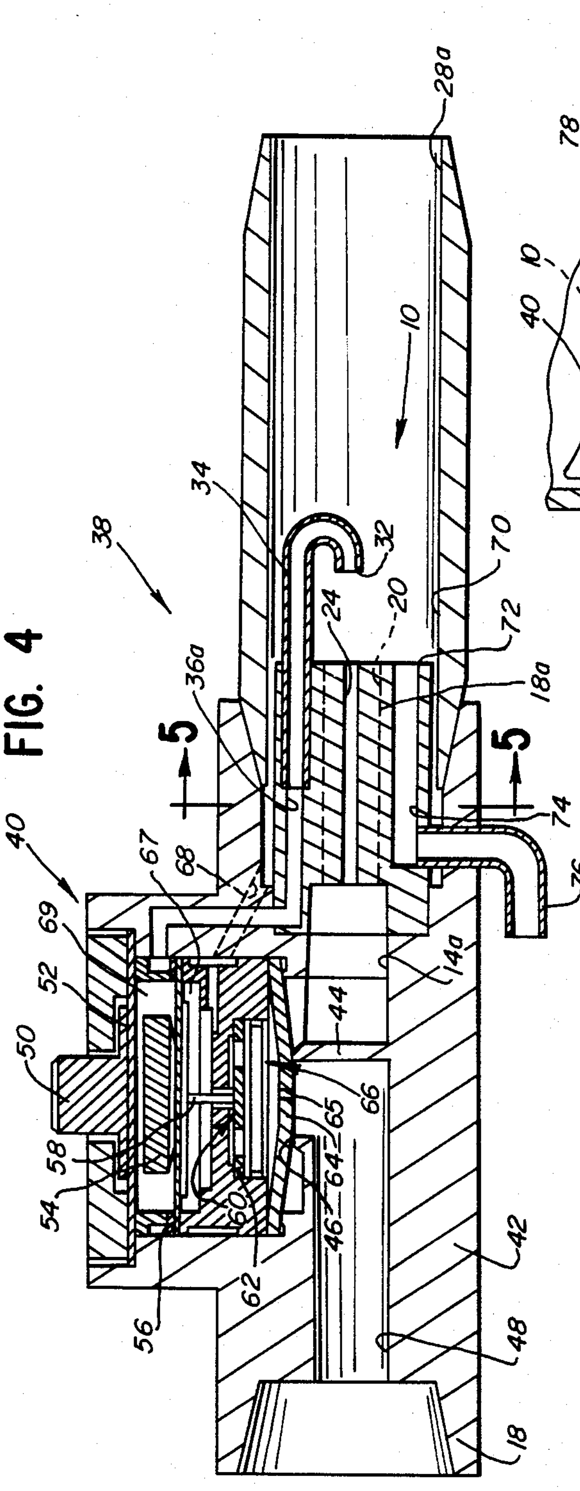
FIG. 4 is an axial section through a nozzle incorporating the dual jet amplifier of the present invention, with a remote sensing means.

Referring to FIG. 4, "dual jet" fluid amplifier 10 is illustrated as incorporated in a supply nozzle, generally designated 38. Like numerals have been applied to like components in relation to the amplifier as described in relation to FIGS. 1–3.

More particularly, first and second passages 20 and 24, respectively, are formed in a housing partition **18*a* to define the main supply stream and signal supply stream, respectively, as described above. The signal developing means defined by port 32 and elbow-shaped conduit 34 leads through conduit means 36*a* to a pressure responsive valve means, generally designated 40. The valve means operates similarly to that shown in U.S. application Ser. No. 491,521, filed May 1, 1983, and which is incorporated herein by reference. The valve means is assembled within a housing 42 which defines liquid flow stream passage 14*a*. The flow stream passes around a partition 44 through a main valve seat 46 to an upstream liquid flow passage or tap line 48 which leads to a coupling 18** for attachment to a supply hose or conduit.

Valve means 40 further includes a manually operable valve opening means having a push-button 50 secured to a diaphragm seal 52. An actuator head 54 is secured to a flexible diaphragm 56 and is engageable by depressing push-button 50 and diaphragm seal 52. An actuator pin 58 depends from the underside of diaphragm 56 and extends through a pilot valve seat 60. The pilot valve seat is sealable by a flapper valve disc 62. A main valve diaphragm 64 is engageable with main valve seat 46 and has a central orifice or bleed hole 65 therethrough. In the normal closed condition as illustrated in FIG. 4, bleed hole 65 permits fluid pressure in liquid flow passage 48 to communicate with a pressure chamber 66 on the inside of main valve diaphragm 64. The fluid line pressure, bleeding through orifice 65, normally maintains main valve diaphragm 64 closed against main valve seat 46.

In order to open the valve, push-button 50 is depressed against actuator head 54 which, in turn, causes actuator pin 58 to move flapper valve disc 62 away from pilot valve seat 60. This releases the pressure in chamber 66 whereupon the fluid pressure communicates and is released through a second pressure chamber 67 and a vent passage 68 to the interior of the fluid amplifier.

When the valve is opened as described above, i.e. main valve diaphragm 64 moves off of main valve seat 46, liquid in flow passage 48 passes around partition 44, through passage 24 and against signal port 32. The pressure signal developed at port 32 communicates through conduit 34 and conduit 36, 36a to a third pressure chamber 69 above diaphragm 56. Pressure in chamber 69, through diaphragm 56 and actuator pin 58, maintains flapper valve disc 62 off of pilot valve seat 60. As long as a pressure signal is generated at sensing port 32, the valve will remain open. However, when signal power stream 26 is diverted away from the sensing port, pressure is relieved in chamber 69 and the various components of the valve will resume their closed condition as shown in FIG. 4.

The form of the invention shown in FIG. 4 incorporates a remote sensing system. More particularly, an access region 70 is located adjacent the signal power stream leading to port 32. An access port 72 leads through a third passage 74 in partition 18a to an elbow-shaped coupling 76. Conduit means, described hereinafter in relation to FIG. 6, leads from coupling 76 to a predetermined point for sensing the level of liquid in a reservoir remote from the fluid amplifier. When the liquid rises to that remote point, air can no longer enter access region 70 and a reduction of pressure occurs in the amplifier housing. This diverts the signal power stream toward the major supply stream which terminates the positive signal to valve means 40 to shut the valve off.

Figure 6:
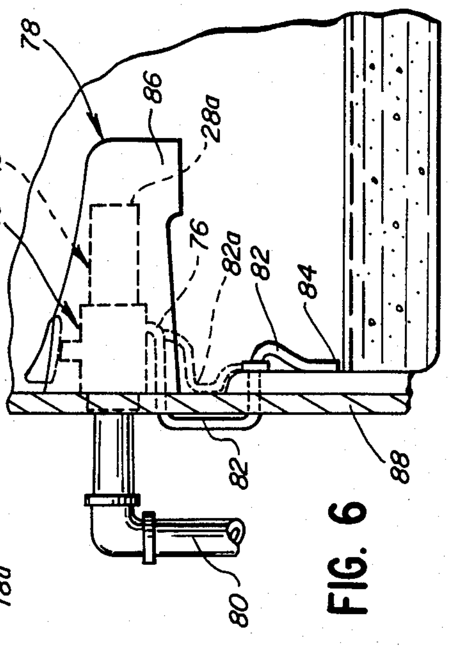
Figure 5:
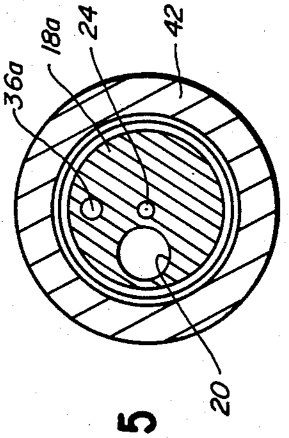
FIG. 5 is a vertical section taken generally along line 5—5 of FIG. 5.

Referring to FIG. 6, "dual jet" fluid amplifier 10 and valve means 40 are incorporated in a nozzle housed within a faucet, generally designated 78, for instance as associated with a bathtub. A water line 80 leads to coupling 18 (FIG. 4) of the faucet. Conduit means in the form of an open ended tube 82 leads from coupling 76 to a distal end 84 defining the predetermined level of liquid in the tub. When the liquid rises to the distal end of tube 82, air can no longer enter the amplifier access region. This reduces the pressure within the amplifier housing and the smaller signal power stream diverts and attaches to the larger or major supply stream. When this occurs, the pressure signal to valve means 40 is reduced to cause the valve means to close and shut-off the supply of liquid.

In order to effect drawing of air through sensing tube 82, it is desirable to provide restriction means for restricting flow of liquid at outlet 28a (FIG. 4). This is accomplished by the nature of the construction of faucet 78 which is in the form of a right-angle bend 86 to divert the water downwardly into the tub. The restriction effected by elbow bend 86 creates a negative pressure in access region 70 (FIG. 4) and, in effect, sucks air upwardly through sensing tube 82 to maintain the pressure within the amplifier, preventing the smaller signal power stream from attaching to the larger, major supply stream.

It can be seen in FIG. 6 that sensing tube 82 is shown as permanently installed through a wall 88 behind the tub or reservoir. In order to adapt an existing faucet to a remote sensing device for a fluid amplifier, it may be desirable not to bore through the wall and tub and, instead, employ a sensing tube 82a on the outside of the wall, as indicated by dotted lines in FIG. 6.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A fluid amplifier adapted for sensing the level of a liquid in a reservoir, storage tank or other container and for generating a differential in pressure signal in response to the static presence of the liquid level at a predetermined level, comprising:

inlet means for developing a liquid flow stream;

an access region downstream of said inlet means;

first passage means in communication with said inlet means and of major cross-sectional dimensions for delivering a major portion of said flow stream through said access region to said reservoir, storage tank or other container;

second passage means in communication with said inlet means for receiving a portion of said flow stream, said second passage means being of minor cross-sectional dimensions spaced laterally of said first passage means for developing a liquid power stream through said access region independent of and generally parallel to said major portion of the flow stream delivered by said first passage means;

sensing means responsive to said static presence of the liquid level at said predetermined level for altering said liquid power stream from said generally parallel condition; and signal developing means for receiving a fluid pressure signal of one magnitude when said liquid power stream is generally parallel and of a second magnitude when said liquid power stream is altered from said generally parallel condition.

2. The fluid amplifier of claim 1, including outlet means having its terminus positioned at said predetermined level whereby the static presence of the liquid level at the terminus of said outlet means causes said parallel liquid power stream to be diverted toward said major portion of said liquid passing through said first passage means.

3. The fluid amplifier of claim 1 wherein said sensing means is remote from and in communication with said access region, said sensing means being responsive to the static presence of the interface at said predetermined liquid level to alter said parallel liquid power stream.

4. the fluid amplifier of claim 3 wherein said sensing means comprises conduit means in communication with and leading from said access region to the predetermined point for sensing the level of liquid in said reservoir, storage tank or other container.

5. The fluid amplifier of claim 4 wherein said conduit means comprises an open ended tube.

6. The fluid amplifier of claim 3, including outlet means having restriction means for restricting flow of liquid therethrough to create a negative pressure in said access region to draw air through said sensing means to alter said parallel liquid power stream.

7. The fluid amplifier of claim 1, including pressure responsive valve means in the liquid flow stream to said inlet means, said signal developing means being operatively associated with said valve means for opening and closing the valve means in response to the parallel or the altered condition of said liquid power stream.

8. A liquid level control device for controlling the flow of liquid into a reservoir, storage tank or other container, comprising:

nozzle means including inlet means for developing a liquid flow stream therethrough, valve means in said liquid flow stream for opening and closing the nozzle, and an access region downstream of said inlet means;

fluid amplifier means in said liquid flow stream and operatively associated with said valve means for generating a positive fluid pressure to maintain said valve means open, said fluid amplifier including first passage means of major cross-sectional dimensions for delivering a major portion of said flow stream through said access region to said reservoir, storage tank or other container, second passage means for receiving a portion of said flow stream and being of minor cross-sectional dimensions spaced laterally of said first passage means for developing a substantially parallel liquid power stream through said access region spaced from said major portion of the flow stream delivered by said first passage means, and signal developing means for receiving a fluid pressure signal of one magnitude when said liquid power stream is parallel and of a second magnitude when said liquid power stream is altered from its parallel condition; and sensing means responsive to the static presence of the interface at a predetermined sensing level of liquid in said reservoir for altering said liquid power stream from said parallel condition.

9. The liquid level control device of claim 8 wherein said nozzle includes outlet means having its terminus located at said predetermined level whereby the static presence of the liquid level at the terminus of said outlet means causes said parallel liquid power stream to be diverted toward said major portion of said liquid passing through said first passage means.

10. The liquid level control device of claim 8, wherein said sensing means is remote from and in communication with said access region, said sensing means being responsive to the static presence of the interface at said predetermined liquid level to alter said parallel liquid power stream.

11. The liquid level control device of claim 10 wherein said sensing means comprises conduit means in communication with and leading from said access region to the predetermined point for sensing the level of liquid in said reservoir, storage tank or other container.

12. The liquid level control device of claim 11 wherein said conduit means comprises an open ended tube.

13. The liquid level control device of claim 10, including outlet means having restriction means for restricting flow of liquid therethrough to create a negative pressure in said access region to draw air through said sensing means to alter said parallel liquid power stream.

14. A fluid amplifier adapted for sensing the level of a liquid in a reservoir, storage tank or other container and for generating a differential in pressure signal in response to the static presence of the liquid level at a predetermined level, comprising:

inlet means for developing a liquid flow stream;

first passage means of major cross-sectional dimensions for delivering a major portion of said flow stream to said reservoir, storage tank or other container;

second passage means of minor cross-sectional dimensions spaced laterally of said first passage means for developing a substantially parallel fluid power stream;

outlet means having its terminus positioned at said predetermined level whereby the static presence of the liquid level at the terminus of said outlet means causes said parallel fluid power stream to be diverted toward said major portion of said liquid passing through said first passage means; and signal developing means for receiving a fluid pressure signal of one magnitude when said fluid power stream is parallel and of a second magnitude when said fluid power stream is diverted.

15. A liquid level control device for controlling the flow of liquid into a reservoir, storage tank or other container, comprising:

nozzle means for developing a liquid flow stream therethrough, valve means in said liquid flow stream for opening and closing the nozzle;

fluid amplifier means in said liquid flow stream and operatively associated with said valve means for generating a positive fluid pressure to maintain said valve means open, said fluid amplifier including first passage means of major cross-sectional dimensions for delivering a major portion of said flow stream to said reservoir, storage tank or other container, second passage means of minor cross-sectional dimensions spaced laterally of said first passage means for developing a substantially parallel fluid power stream, and signal developing means for receiving a fluid pressure signal of one magnitude when said fluid power stream is parallel and of a second magnitude when said fluid power stream is diverted from its parallel condition; and outlet means having its terminus located at said predetermined level whereby the static presence of the liquid level at the terminus of said outlet means causes said parallel fluid power stream to be diverted toward said major portion of said liquid passing through said first passage means.

16. A fluid amplifier adapted for sensing the level of a liquid in a reservoir, storage tank or other container and for generating a differential in pressure signal in response to the static presence of the liquid level at a predetermined level, comprising:

inlet means for developing a liquid flow stream;

first passage means of major cross-sectional dimensions for delivering a major portion of said flow stream to said reservoir, storage tank or other container;

second passage means of minor cross-sectional dimensions spaced laterally of said first passage means for developing a substantially parallel fluid power stream;

sensing means responsive to said static presence of the liquid level at said predetermined level for diverting said fluid power stream away from said parallel condition; and signal developing means for receiving a fluid pressure signal of one magnitude when said fluid power stream is parallel and of a second magnitude when said fluid power stream is diverted from said parallel condition.

17. A liquid level control device for controlling the flow of liquid into a reservoir, storage tank or other container, comprising:

nozzle means for developing a liquid flow stream therethrough, valve means in said liquid flow stream for opening and closing the nozzle;

fluid amplifier means in said liquid flow stream and operatively associated with said valve means for generating a positive fluid pressure ot maintain said valve means open, said fluid amplifier including first passage means of major cross-sectional dimensions for delivering a major portion of said flow stream to said reservoir, storage tank or other container, second passage means of minor cross-sectional dimensions spaced laterally of said first passage means for developing a substantially parallel fluid power stream, and signal developing means for receiving a fluid pressure signal of one magnitude when said fluid power stream is parallel and of a second magnitude when said fluid power stream is diverted from its parallel condition; and sensing means responsive to the static presence of the interface at a predetermined sensing level of liquid in said reservoir for diverting said fluid power stream away from said parallel condition.

* * * * *